UNITED STATES PATENT OFFICE.

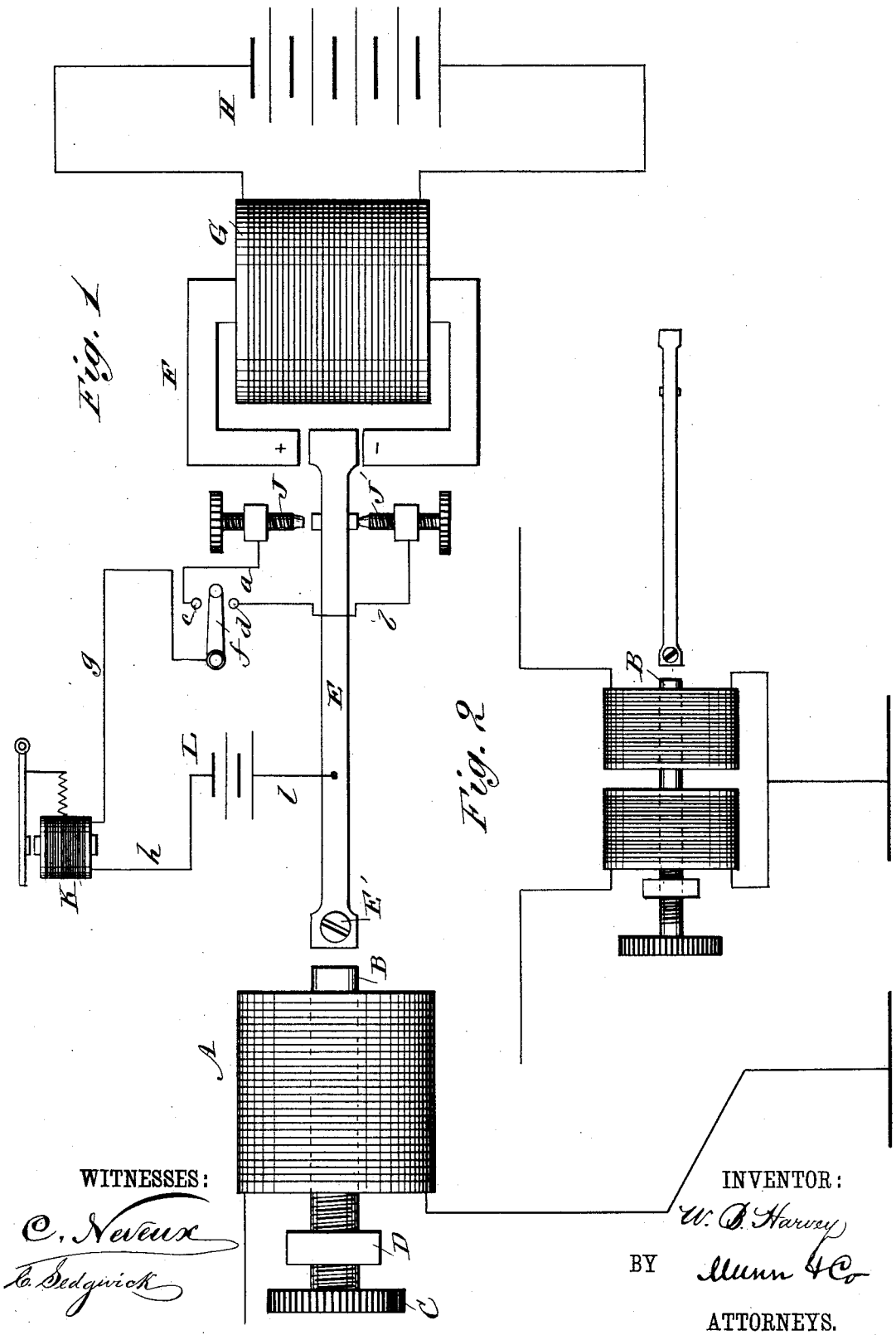

WIRT B. HARVEY, OF MEMPHIS, TENNESSEE.

POLARIZED TELEGRAPHIC RELAY.

SPECIFICATION forming part of Letters Patent No. 308,610, dated December 2, 1884.

Application filed January 24, 1884. (No model.)

*To all whom it may concern:*

Be it known that I, WIRT B. HARVEY, of Memphis, in the county of Shelby and State of Tennessee, have invented a new and useful Improvement in Polarized Telegraph-Relays, of which the following is a full, clear, and exact description.

The object of my invention is to provide a new and improved polarized telegraph-relay, which is so constructed that the armature can be adjusted for any strength of current circulating through the coil without requiring any changes in the positions of the poles between which the free end of the armature swings.

The invention consists in the combination, with a swinging armature, having one end held between the two poles of a magnet, of a coil held opposite the other end of the armature, which coil is provided with a core, part of which is screw-threaded, or has a screw-threaded piece attached, whereby by turning the said core and the coil thereon the coil can be adjusted a greater or less distance from the end of the armature.

Reference is to be had to the accompanying drawings, forming a part of this specification, in which similar letters of reference indicate corresponding parts in both the figures.

Figure 1 is a plan view of my polarized telegraph-relay. Fig. 2 is a plan view of a modification of the coil.

The coil A, of the usual construction, is provided with a core, B, which has one end screw-threaded and provided with a milled head, C, the screw-threaded part being passed into a threaded aperture in the standard D. If desired, two coils can be mounted on the core B, as shown in Fig. 2, or the coil can contain two different circuits, upon which two currents or branches of currents can circulate in opposite directions in case the coil is to be used for a differential electro-magnet. A soft-iron armature, E, is pivoted at E', and its free end is held between the ends of the core F of the electro-magnet G, which is excited by a battery, H, or the electro-magnet G can be replaced by a permanent magnet.

Adjoining the pivoted armature E two set-screws, J and J', are held in suitable standards connected by wires $a$ and $b$, respectively, with contact-buttons $c$ and $d$, between which the pivoted switch $f$ is located, which is connected by a wire, $g$, with one end of the sounder-coil K, the other end of which sounder-coil is connected by a wire, $h$, with a local battery, L, which local battery is connected by a wire, $l$, with the armature E. By means of the screws J and J' the oscillation of the armature can be adjusted. The coil A is connected with the main-line wire and the ground. If the circuit passes through the wire in the coil A, the core B will be excited, and the armature E will be swung to either the positive or negative pole of the core F of the magnet G, according as to whether a positive or negative current is flowing through the coil A; and if the switch-lever $f$ is on the button $c$ the circuit will be closed through the screw J, the wire $a$, the button $c$, the switch-lever $f$, the wire $g$, the sounder-magnet K, the wire $h$, the local battery L, and the wire $l$, until a current of the opposite polarity is made to pass through the coil A, which is accomplished in the usual way at distant stations, it being understood that the armature E is so adjusted by the screws J J' in regard to the magnet F that the armature will remain against either the screw J or J' when placed there and no current passes through the coil A. If the effect of the main current on the armature is to be increased, the core B is turned by means of the head C in such a manner that the end of the core B will be carried by the screw-thread on the said core nearer to the end of the armature E; and if the effect of the main current is to be decreased, the core B is to be turned in such a manner as to withdraw its end from the end of the armature E. I am thus enabled to adjust the effects of the main current without requiring any adjustment or change of the poles of the core F of the magnet G, or the permanent magnet, which always remain in the same position.

By means of the switch-key the signals from a distant station can be reversed on sounder K by merely changing it from contact $c$ to contact $d$, which is now usually accomplished by changing the wires running into the polarized relay. The armature E, of soft iron, is not in connection with any pole of a permanent or electro magnet, and, as it has no coil to carry, it can swing readily and freely, and be constructed as light as is desirable.

Having thus described my invention, I claim as new and desire to secure by Letters Patent—

1. The combination, with a swinging armature having its free end held between the two poles of a magnet, of an electro-magnet adjoining the pivoted end of said armature, and connected with the line-wire, and adapted to be moved a greater or less distance from the pivoted end of said armature, substantially as herein shown and described.

2. The combination, with a swinging armature having its free end held between the two poles of a magnet, of an electro-magnet near the pivoted end of said armature, and connected with the line-wire, and having part of its core screw-threaded or being attached to a screw-threaded piece for the purpose of moving the said coil toward or from the pivoted end of the armature, substantially as herein shown and described.

3. The combination, with the swinging armature E, having its free end held between the two poles of a magnet, of the coil A, connected with the line-wire and placed adjacent to the pivoted end of the armature, and having a core, B, in alignment with the armature, and part of which core is screw-threaded, or is attached to a screw-threaded piece and held in a standard, D, and of the head C, on the outer end of the threaded piece, substantially as herein shown and described.

4. In a polarized telegraph-relay, the combination, with a swinging armature, E, having its free end held between the poles of a magnet, of the coil A, adjacent to the pivoted end of the armature, and connected with the line-wire, and adapted to be adjusted a greater or less distance from the said pivoted end of the armature E, and of the screws J J' on either side of the armature, and connected with the opposite ends of the sounder-coil, and with a local battery, substantially as herein shown and described.

5. In a polarized telegraph-relay, the combination, with a swinging armature, E, having one end held between the poles of a magnet, of the coil A, adapted to be adjusted a greater or less distance from the end of the armature E, the screws J J', the switch f, and wires for connecting the screws with the contact-button of said switch, a wire for connecting the switch with the sounder-magnet, and wires for connecting the sounder-magnet with the swinging armature E, substantially as herein shown and described.

WIRT B. HARVEY.

Witnesses:
JAMES H. MALONE,
F. P. POSTON.